Patented Sept. 19, 1939

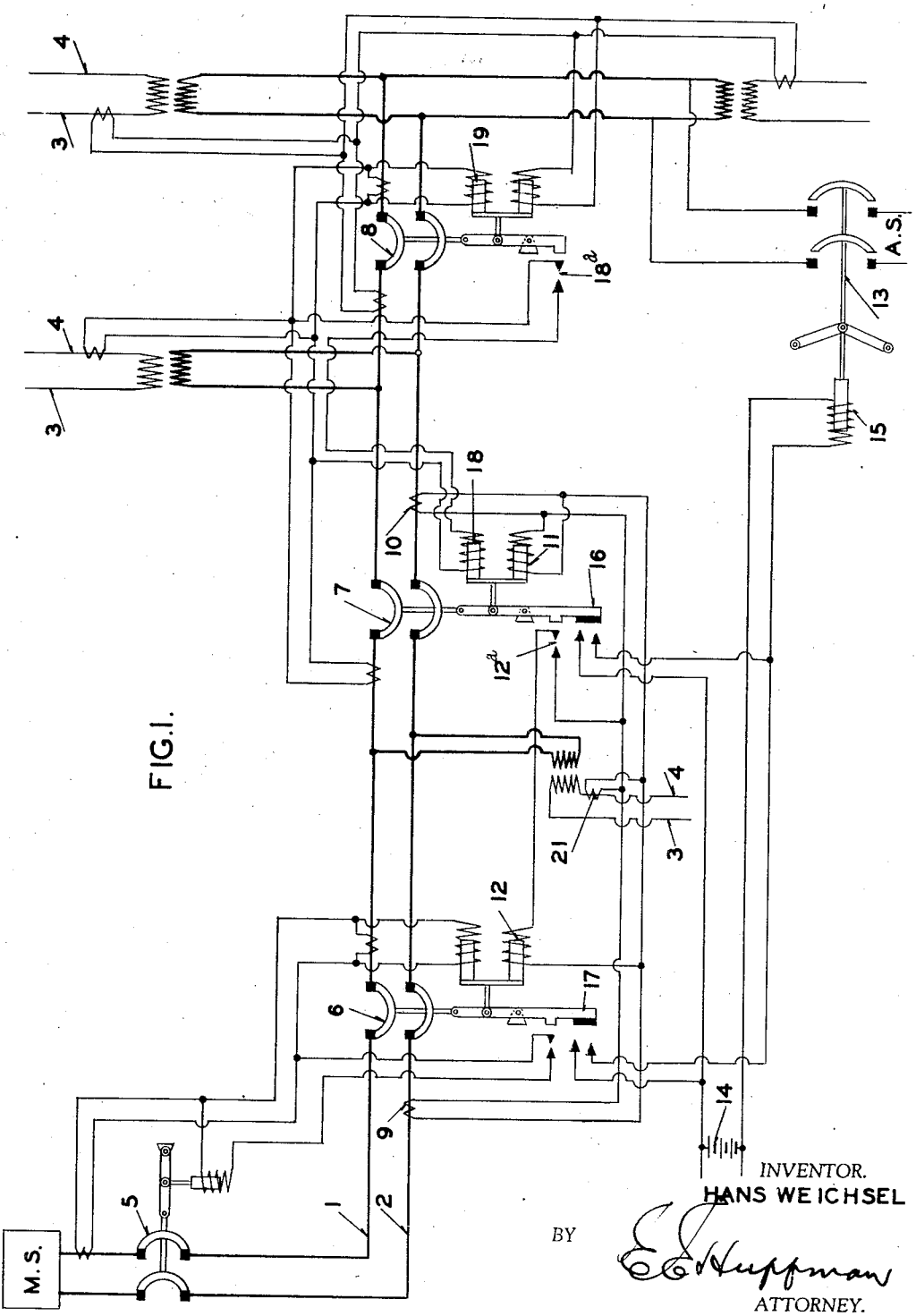

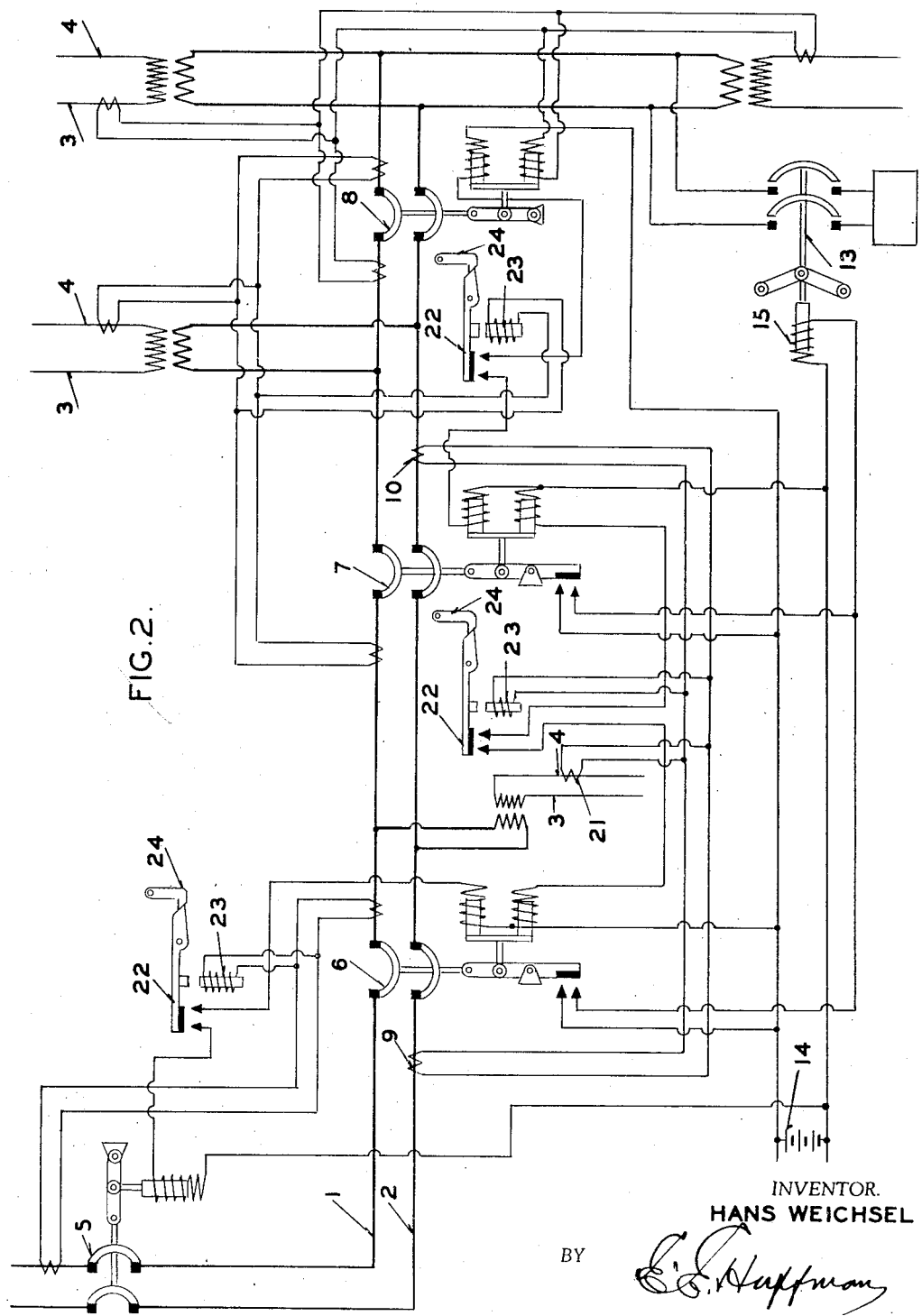

2,173,672

UNITED STATES PATENT OFFICE 2,173,672

ELECTRIC DISTRIBUTION SYSTEM

Hans Weichsel, Webster Groves, Mo., assignor to Wagner Electric Corporation, St. Louis, Mo., a corporation of Delaware Application November 17, 1938, Serial No. 240,903

5 Claims. (Cl. 171—97)

My invention pertains to electric power distribution systems, commonly referred to as "radial systems", which comprise a main feeder circuit leading from a generating station, and branch load circuits supplied by the feeder. When a fault (short circuit or ground) occurs in distribution systems of this type the resulting overload trips the circuit breaker at the station and the entire system is out of service until the fault can be located. The portion of the system at and beyond the fault is then disconnected from the generating station in order that the remaining part may be again supplied with current without waiting for repair of the fault.

According to a known practice, means are provided whereby the portion of a particular radial system on the opposite side of its station from the fault, may also be isolated from the fault and then connected to another generating station which is the normal supply for another radial system but which has sufficient capacity to temporarily supply the isolated end of the first mentioned system in which the fault occurred.

Experience with distribution systems of the kind above described is that frequently large areas are without light and power for a considerable time since neither the normal supply station nor an auxiliary substation can be connected to the operative parts of a radial system until the fault is located. It is the object of my invention to provide means for automatically isolating a fault and which means will immediately thereafter connect the substation which serves as "standby" for a particular radial system, to the portion of that system which, during the time of isolation of the faulty section, cannot be supplied from the station which normally supplies it.

In the accompanying drawings Figure 1 illustrates an embodiment of my invention, and Figure 2 shows a modification.

Referring to Figure 1, heavy lines 1—2 indicate the main feeder (single phase being illustrated for convenience) supplied from a source "M. S." and which may be either a power generating station or a transformer substation. In the following description it is referred to as the "main source" in relation to the particular radial distribution system illustrated, and the power station which operates as "standby" for this system, is indicated at the lower right-hand corner of the drawings and marked "A. S." and hereinafter referred to as "auxiliary source."

Leads 3—4 indicate the light and power load circuits connected to the main feeder through voltage reduction transformers. The feeder is provided with circuit interrupting devices 5, 6, 7 and 8 which divide the distribution system into sections. Circuit breakers 6, 7 and 8 each have two associated trip coils as indicated, which are in pilot wire control circuits comprising spaced apart current transformers energized from the main feeder.

Current transformer 9 located on the main station side of breaker 6 is in circuit with current transformer 10 in the feeder at a point adjacent to but beyond circuit breaker 7 in relation to the main source, and current transformer 21, in the load circuit between breakers 6 and 7, is connected in parallel with transformers 9 and 10. These three transformers are so proportioned and connected that under normal operating conditions insufficient current will flow in trip coil 11 to open breaker 7. However, on occurrence of a fault in the section between breakers 6 and 7, such unbalance will occur in the series transformer circuit as will result in substantial current flowing through coil 11 and opening breaker 7, whereupon breaker 6 will be opened by coil 12, the circuit of this coil being closed at 12—a when breaker 7 is in open position.

The opening of breakers 6 and 7 brings into operation another pilot wire system whose purpose is to actuate switch 13 to closed position, whereby the auxiliary station will be connected to the main feeders 1 and 2 at a point beyond circuit breaker 7. This last mentioned pilot circuit comprises a battery, or other independent source of energy 14, which operates trip coil 15, the circuit being closed, through the connections shown, by the switch 16 which is brought to closed position when breaker 7 is opened.

The drawings illustrate circuits like those described for isolating the feeder section between breakers 7 and 8, the occurrence of a fault in this section resulting in opening these breakers by means of the trip coils 18 and 19. When this occurs switch 16 establishes the circuit above described whereby switch 13 is closed so that that part of the system beyond (in relation to the main station) the fault, is supplied with energy.

It will be apparent that while I have illustrated a system having two isolatable sections intermediate the end sections, the number of isolatable sections may be increased by further duplication of the circuits illustrated, and that not only is the section in which a fault occurs automatically isolated from the rest of the distribution system, but the portion beyond the fault is automatically resupplied with energy, whereby there will be no interruption of service to customers supplied from the system except those receiving supply from the isolated section.

It is, of course, essential to the control system described, that in isolating a section, the breaker furthest from the main station is opened prior to the opening of the breaker at the end of the faulty section nearest the main station; and in Figure 1 the particular trip coil 12 which operates breaker 7 on occurrence of a fault in the section between 6 and 7, is in a normally opened shunt across the circuits embodying transformers 9 and 10, this shunt being closed at contact 12—a by the opening of breaker 7. In a similar manner contacts 18—a in the circuit of trip coil 18 of breaker 7 determine that this breaker will not open until after breaker 8 is opened.

Figure 2 shows alternative circuit control whereby it is immaterial which main line circuit breaker is first to open. In this figure the circuit breaker trip coils receive their energy from the D. C. pilot circuit which controls the auxiliary line switch 13. The closing of these trip coil circuits is by switches 22 operated by solenoids 23. A solenoid and controlled switch 22 is associated with the current transformer circuit for each isolatable section. A latch 24 is provided for each solenoid operated switch 22, whereby when the switch is brought to closed position, it will be mechanically held in that position. The reason for this provision is that if the two isolating circuit breakers do not open simultaneously, the opening of one may result in such deenergization of the current transformer circuits as would permit switch 22 to again open before the other line circuit breaker had opened. In the form of control illustrated in Figure 2 time delay means would be embodied in switch 13 whereby this switch would attain closed position only after the breaker between it and the faulty section is open.

Having fully described my invention, what I claim as new and desire to secure by Letters Patent of the United States is:

1. An electric distribution system comprising a main feeder circuit and a plurality of load circuits connected in parallel to a main current supply source by said feeder, an auxiliary source of current supply, circuit opening switches at spaced points in said feeder, a control circuit inoperative during existence of normal conditions in the distribution system but rendered operative by occurrence of a fault to open the circuit of said feeder on both sides of said fault, said control circuit also simultaneously functioning to cause a part of the feeder which is separated from the main source by the isolated section to be connected to the auxiliary source of current supply.

2. An electric distribution system comprising a main feeder circuit having a plurality of spaced apart circuit breakers dividing the feeder into a plurality of sections, a plurality of load circuits supplied by said feeder, an auxiliary source of current supply, control circuits for each of a plurality of sections of the feeder, each control circuit comprising a current transformer in a load circuit and current transformers in the feeder on opposite sides of the point of connection of the load circuit to said feeder, a trip coil for operating a circuit breaker and connected in parallel with said current transformers, said current transformers being so proportioned and connected together that under normal operating conditions the trip coil is not sufficiently energized to operate its circuit breaker but will be energized under condition of a fault which produces an unbalance in the current transformer circuit, and means whereby energization of the trip coil to actuate its circuit breaker will cause the auxiliary current supply to be connected to that part of the main feeder separated from the main source by the actuation of the circuit breaker.

3. An electric distribution system comprising a main feeder circuit having a plurality of spaced apart circuit breakers dividing the feeder into a plurality of sections, a plurality of load circuits supplied by said feeder, an auxiliary source of current supply, control circuits for each of a plurality of sections of the feeder, each control circuit comprising a current transformer in a load circuit and current transformers in the feeder on opposite sides of the point of connection of the load circuit to said feeder, a switch operable by a solenoid connected in parallel with said current transformers, said current transformers being so proportioned and connected together that under normal operating conditions the solenoid is not sufficiently energized to operate its switch but will be energized under condition of a fault which produces an unbalance in the current transformer circuit, and means whereby energization of the solenoid will cause a feeder circuit breaker to open and will cause the auxiliary current supply to be connected to that part of the main feeder separated from the main source by the actuation of the circuit breaker.

4. An electric distribution system comprising a main feeder circuit having a plurality of spaced apart circuit breakers dividing the feeder into a plurality of sections, a plurality of load circuits supplied by said feeder, an auxiliary source of current supply, control circuits for each of a plurality of sections of the feeder, each control circuit comprising a current transformer in a load circuit and current transformers on opposite sides of the point of connection of the load circuit to said feeder, a solenoid connected in parallel with said current transformers, said current transformers being so proportioned and connected together that under normal operating conditions the solenoid is not operatively energized but will be so energized under condition of a fault which produces an unbalance in the current transformer circuit, and means operable by said solenoid, when energized, to cause a feeder circuit breaker to disconnect from the main source the part of the feeder beyond the fault and to connect the auxiliary current supply to said last mentioned portion of the feeder after said circuit breaker is opened.

5. An electric distribution system comprising a main feeder circuit having a plurality of spaced apart circuit breakers dividing the feeder into a plurality of sections, a plurality of load circuits supplied by said feeder, an auxiliary source of current supply, control circuits for each of a plurality of sections of the feeder, each control circuit comprising a current transformer in a load circuit and current transformers in the feeder on opposite sides of the point of connection of the load circuit to said feeder, a trip coil for operating a circuit breaker and connected in parallel with said current transformers, said current transformers being so proportioned and connected together that under normal operating conditions the trip coil is not sufficiently energized to operate its circuit breaker but will be so energized under condition of a fault which produces an unbalance in the current transformer circuit, means whereby energization of the trip coil to actuate its circuit breaker will cause the auxiliary current supply to be connected to that part of the main feeder separated from the main source by the actuation of the circuit breaker, and means energized with the actuation of said circuit breaker to open the circuit breaker at the other end of the section in which the fault occurred.

HANS WEICHSEL.